(12) United States Patent
Duga et al.

(10) Patent No.: US 8,385,659 B2
(45) Date of Patent: Feb. 26, 2013

(54) SYSTEM FOR AND METHOD OF DISPLAYING NON-RECTANGULAR IMAGES IN ELECTRONIC CONTENT ON A READER DEVICE

(76) Inventors: Brady Duga, Carlsbad, CA (US); John Rivlin, Palo Alto, CA (US); Vincent Le Chevalier, San Jose, CA (US); Garth Conboy, La Jolla, CA (US)

( * ) Notice: Subject to any disclaimer, the term of this patent is extended or adjusted under 35 U.S.C. 154(b) by 407 days.

(21) Appl. No.: 12/756,704

(22) Filed: Apr. 8, 2010

(65) Prior Publication Data

US 2011/0249903 A1 Oct. 13, 2011

(51) Int. Cl.
*G06K 9/64* (2006.01)
*G06F 17/21* (2006.01)

(52) U.S. Cl. ........ 382/218; 382/283; 382/284; 715/246; 715/247

(58) Field of Classification Search ................. 382/217, 382/218, 283, 284; 715/243, 246, 247
See application file for complete search history.

(56) References Cited

U.S. PATENT DOCUMENTS

| | | | |
|---|---|---|---|
| 5,586,196 A | 12/1996 | Sussman | |
| 5,805,170 A * | 9/1998 | Burch | 345/619 |
| 2004/0183830 A1 | 9/2004 | Cody et al. | |
| 2005/0125728 A1 | 6/2005 | Peiro et al. | |
| 2005/0228683 A1 | 10/2005 | Saylor et al. | |
| 2007/0055929 A1 | 3/2007 | Giannetti et al. | |
| 2007/0101289 A1 * | 5/2007 | Awada et al. | 715/784 |
| 2007/0146833 A1 | 6/2007 | Satomi et al. | |
| 2007/0266309 A1 * | 11/2007 | Sellman | 715/513 |
| 2009/0300526 A1 | 12/2009 | Port | |

OTHER PUBLICATIONS

International Search Report Dated Aug. 19, 2011 for International Application No. PCT/US11/31741.

* cited by examiner

*Primary Examiner* — Jon Chang
(74) *Attorney, Agent, or Firm* — Hunton & Williams LLP (57) ABSTRACT

A system for and method of displaying non-rectangular images in electronic content on an electronic device in accordance with exemplary embodiments may include identifying, using a template identification computing apparatus, an image shape template associated with a non-rectangular image that is part of electronic content to be displayed on the electronic device, determining, using a boundary region determination computing apparatus, a boundary region of the image shape template, placing, using an image placement computing apparatus, the non-rectangular image inside the boundary region of the image shape template and on the electronic content, flowing, using a text flow computing apparatus, text that is part of the electronic content outside and along the boundary region of the image shape template, and transmitting, using a communication computing apparatus, the electronic content along with the non-rectangular image to the electronic device via a network.

18 Claims, 9 Drawing Sheets

SYSTEM FOR AND METHOD OF DISPLAYING NON-RECTANGULAR IMAGES IN ELECTRONIC CONTENT ON A READER DEVICE

FIELD OF THE INVENTION

The present invention relates to displaying electronic content, generally, and a system for and method of displaying non-rectangular images in electronic content on a reader device, in particular.

BACKGROUND INFORMATION

In general, rectangular shaped images may be embedded within digitally published content (e.g., web-based content). In such instances, a text portion of the digitally published content may be flowed around the rectangular shaped images. In many cases, however, images may have a non-rectangular shape.

BRIEF DESCRIPTION OF THE DRAWINGS

Purposes and scope of exemplary embodiments described below will be apparent from the following detailed description in conjunction with the appended drawings in which like reference characters are used to indicate like elements, and in which.

SUMMARY OF EMBODIMENTS OF THE INVENTION

At least one exemplary embodiment may provide a method for displaying non-rectangular images, wherein the non-rectangular images may comprise video clips, in electronic content on an electronic device. This embodiment may include identifying, using a template identification computing apparatus, an image shape template associated with a non-rectangular image that is part of electronic content to be displayed on the electronic device, determining, using a boundary region determination computing apparatus, a boundary region of the image shape template, placing, using an image placement computing apparatus, the non-rectangular image inside the boundary region of the image shape template and on the electronic content, flowing, using a text flow computing apparatus, text that is part of the electronic content outside and along the boundary region of the image shape template, and transmitting, using a communication computing apparatus, the electronic content along with the non-rectangular image to the electronic device via a network.

Another exemplary embodiment according to this invention may provide a system for displaying non-rectangular images, wherein the non-rectangular images may comprise video clips, in electronic content on an electronic device. This embodiment may include a template identification computing apparatus configured to identify a non-rectangular image shape template associated with an image that is part of electronic content to be displayed on the electronic device, a boundary region determination computing apparatus configured to determine a boundary region of the image shape template, an image placement computing apparatus configured to place the non-rectangular image inside the boundary region of the image shape template and on the electronic content, a text flow computing apparatus configured to flow text that is part of the electronic content outside and along the boundary region of the image shape template, and a communication computing apparatus configured to transmit the electronic content along with the non-rectangular image to the electronic device via a network.

DETAILED DESCRIPTION OF EMBODIMENTS OF THE INVENTION

A reader device may display rectangular images in electronic content (e.g., perishable content, web-based content, electronic newspapers, electronic magazines) on a display screen (e.g., an electrophoretic display (EPD) screen, a plasma display screen, a liquid crystal display (LCD) screen, an organic light emitting diode (OLED) display screen). During a content layout stage (e.g., prior to transmission of the electronic content to the reader device), a text portion of the electronic content may be flowed around the rectangular images using current content layout techniques. The use of such basic image shapes, however, may fail to provide a user of a reader device with a rich visual experience. Accordingly, an enhanced content layout system may provide mechanisms for embedding and displaying non-rectangular images in electronic content.

An enhanced content layout system may allow one or more non-rectangular images to be embedded in electronic content to be transmitted to and displayed on one or more reader devices. The enhanced content layout system may communicatively couple one or more reader devices to a content layout system using a data network (e.g., a broadcast network, a cellular network, a content distribution network (CDN)). In one embodiment, the content layout system may be configured to prepare and transmit electronic content with one or more embedded non-rectangular images to one or more reader devices using the data network.

Prior to transmitting the electronic content, the content layout system may embed one or more non-rectangular images into the electronic content using one or more image shape templates. An image shape template may include any diagram of a shape (e.g., a polygon shape, a circle shape, a free-form shape) that is similar to the shape of a particular non-rectangular image. For example, the content layout system may use an oval image shape template to embed a first non-rectangular image (e.g., an image of a giraffe) into electronic content. In another example, the content layout system may use a triangular image shape template to embed a second non-rectangular image (e.g., an image of a pyramid) into electronic content. In yet another example, the content layout system may use a circular image shape template to embed a third non-rectangular image (e.g., an image of a star) into electronic content. Accordingly, the content layout system may identify a particular image shape template for each non-rectangular image to be embedded in electronic content.

Once a particular image shape template is identified for a non-rectangular image, the content layout system may determine (e.g., calculate) a boundary region that is defined by the image shape template. The boundary region of an image shape template may be defined by the sides (or circumference) of the shape of the image shape template. For example, the boundary region of a pentagonal image shape template may be defined by the five (5) sides of the pentagon. In another example, the boundary region of a circular image shape template may be defined by the circumference of the circle. In one embodiment, the content layout system may determine (e.g., calculate) the boundary region of an image shape template using one or more coordinates lying on the sides (or circumference) of the image shape template.

Based on the boundary region of a particular image shape template, the content layout system may place a non-rectangular image within the boundary region of the image shape template. In one embodiment, placing a non-rectangular image within the boundary region of the image shape template may include clipping the non-rectangular image to fit within the boundary region. The content layout system may also flow text of the electronic content outside and along the boundary region of the image shape template. Once one or more non-rectangular images are embedded into the electronic content, the content layout system may transmit the electronic content to one or more reader devices using a data network.

Figure 1:
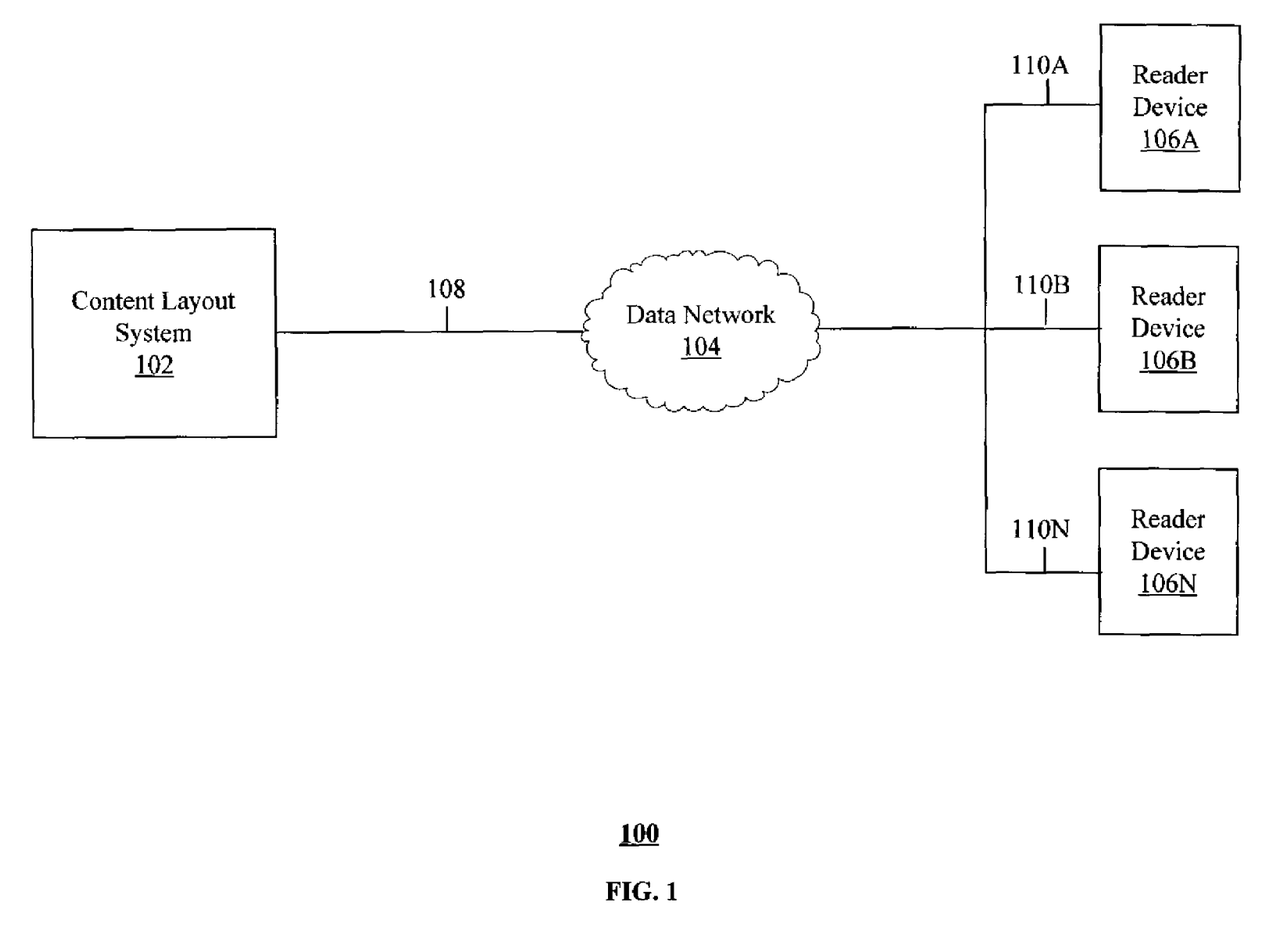
FIG. 1 illustrates a block diagram of an enhanced content layout system according to an embodiment of the invention.

FIG. 1 illustrates a block diagram of an enhanced content layout system according to an embodiment of the invention. In one embodiment, an enhanced content layout system 100 may communicatively couple any, or a combination, of a content layout system 102 and reader devices 106A, 106B, 106N using any, or a combination, of data network 104 and data paths 108, 110A, 110B, 110N. Accordingly, data signals may be transmitted to any of the components of the enhanced content layout system 100 and transmitted from any of the components of the enhanced content layout system 100 using any, or a combination, of data network 104 and data paths 108, 110A, 110B, 110N. For example, electronic content data signals, non-rectangular image data signals, or any other data signals may be transmitted to any of the components of the enhanced content layout system 100 and transmitted from any of the components of the enhanced content layout system 100 using any, or a combination, of data network 104 and data paths 108, 110A, 110B, 110N.

The data network 104 may be a wireless network, a wired network, or any combination of wireless network and wired network. For example, the data network 104 may include any, or a combination, of a fiber optics network, a passive optical network, a radio near field communication network (e.g., a Bluetooth network), a cable network, an Internet network, a satellite network (e.g., operating in Band C, Band Ku, or Band Ka), a wireless local area network (LAN), a Global System for Mobile Communication (GSM), a Personal Communication Service (PCS), a Personal Area Network (PAN), D-AMPS, Wi-Fi, Fixed Wireless Data, IEEE 802.11a, 802.11b, 802.15.1, 802.11n and 802.11g or any other wired or wireless network configured to transmit or receive a data signal. In addition, the data network 104 may include, without limitation, a telephone line, fiber optics, IEEE Ethernet 802.3, a wide area network (WAN), a LAN, or a global network, such as the Internet. Also, the data network 104 may support, an Internet network, a wireless communication network, a cellular network, a broadcast network, or the like, or any combination thereof. The data network 104 may further include one, or any number of the exemplary types of networks mentioned above operating as a stand-alone network or in cooperation with each other. The data network 104 may utilize one or more protocols of one or more network elements to which it is communicatively coupled. The data network 104 may translate to or from other protocols to one or more protocols of network devices. Although the data network 104 is depicted as one network, it should be appreciated that according to one or more embodiments, the data network 104 may comprise a plurality of interconnected networks, such as, for example, a service provider network, the Internet, a broadcaster's network, a cable television network, corporate networks, and home networks. The data network 104 may be configured to perform the functions of the content distribution network (CDN) described in U.S. patent application Ser. No. 12/248,482 entitled "Systems, Methods And Apparatus For Content Distribution," filed on Oct. 9, 2008, which is incorporated by reference herein in its entirety.

The content layout system 102 and reader devices 106A, 106B, 106N may transmit data to and receive data from the data network 104. The data may be transmitted and received utilizing a standard telecommunications protocol or a standard networking protocol. For example, one embodiment may utilize Session Initiation Protocol (SIP). In other embodiments, the data may be transmitted, received, or a combination of both, utilizing other VoIP or messaging protocols. For example, data may also be transmitted, received, or a combination of both, using Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and systems suitable for transmitting and receiving data. Data may be transmitted and received wirelessly or may utilize cabled network or telecom connections such as: an Ethernet RJ45/Category 5 Ethernet connection, a fiber connection, a traditional phone wire-line connection, a cable connection, or other wired network connection. The data network 104 may use standard wireless protocols including IEEE 802.11a, 802.11b, 802.11g, and 802.11n. The data network 104 may also use protocols for a wired connection, such as an IEEE Ethernet 802.3.

The content layout system 102 may be communicatively coupled to data network 104 via data path 108. The content layout system 102 may include, but is not limited to, a computer device or communications device. For example, the content layout system 102 may include a personal computer (PC), a workstation, a mobile device, a thin system, a fat system, a network appliance, an Internet browser, a server, a lap top device, a VoIP device, an ATA, a video server, a Public Switched Telephone Network (PSTN) gateway, a Mobile Switching Center (MSC) gateway, or any other device that is configured to identify an image shape template associated with a non-rectangular image that is part of electronic content to be transmitted to and displayed on reader devices 106A, 106B, 106N, determine a boundary region of the image shape template, place the non-rectangular image inside the boundary region of the image shape template, flow text that is part of the electronic content outside and along the boundary region of the image shape template, and transmit the electronic content with one or more non-rectangular images to reader devices 106A, 106B, 106N. Details of the content layout system 102 are provided below.

The reader devices 106A, 106B, 106N may be communicatively coupled to data network 104 via data paths 110A, 110B, 110N, respectively. In one embodiment, the reader devices 106A, 106B, 106N may be configured to display electronic content to an end-user (e.g., subscriber) using a display screen (e.g., an EPD display screen, a plasma screen, a LCD display screen, an OLED display screen). It should be noted that reader devices 106A, 106B, 106N may be configured to display electronic content using other display screens. For example, reader devices 106A, 106B, 106N may be configured to use an E-paper display screen developed by the Pixel Qi Corporation of San Bruno, Calif. The functionalities of the reader devices 106A, 106B, 106N may include those described in U.S. patent application Ser. No. 12/248,331 entitled "Media Display Device And Method Of Operation Thereof," filed on Oct. 9, 2008, which is incorporated by reference herein in its entirety.

Any electronic device having a display that can render electronic content or images may be used. In one embodiment, reader device 106 may be an electronic reading device. Examples of electronic reading devices include electronic book readers, electronic newspaper readers, electronic paper readers, etc. Examples of an electronic display device are disclosed in U.S. patent application Ser. No. 12/481,677 entitled "Flexible Electronic Device And Method Of Manufacture"; U.S. patent application Ser. No. 12/248,331 entitled "Foldable Media Device"; U.S. patent application Ser. No. 12/332,860 entitled "Touch Sensitive Illuminated Display"; U.S. patent application Ser. No. 12/549,785 entitled "Thin Reader Device"; and U.S. patent application Ser. No. 12/574,721 entitled "Always On Reader Device." The disclosure of each of these patent applications is incorporated, by reference, it its entirety.

Other examples of electronic reading devices include the Amazon Kindle, the Sony Reader, the Plastic Logic Reader, and the iRex iLiad electronic reader. Other examples of electronic devices include computers (e.g., desktops, notebooks, laptops, tablets, web books, net books), personal digital assistants (PDAs), digital cameras, digital picture frames, music players, potable video players, video game players, telephones, mobile telephones, etc.

Other related disclosures include U.S. Patent Application No. 60/978,748 entitled "Content Distribution And Preloading"; U.S. patent application Ser. No. 12/481,336 entitled "System And Method For Providing Spatial And Temporal Content In An Electronic Device"; U.S. patent application Ser. No. 12/481,705 entitled "System And Method For Providing Sub-Publication Content In An Electronic Device"; U.S. patent application Ser. No. 12/481,306 entitled "Electronic Paper Display Device Event Tracking"; U.S. patent application Ser. No. 12/481,365 entitled "System And Method For Delivering Publication Content To Reader Devices Using Mixed Mode Transmission"; U.S. patent application Ser. No. 12/575,009 entitled "Electronic Advertisement Placement"; and U.S. patent application Ser. No. 12/639,512 entitled "System And Method For Rendering Advertisements On An Electronic Device." The disclosure of each of these patent applications is incorporated, by reference, in its entirety.

The reader devices 106A, 106B, 106N may be configured to receive the electronic content with one or more embedded non-rectangular images from the content layout system 102. Based on input from a user, reader devices 106A, 106B, 106N may display the electronic content with the one or more embedded non-rectangular images to the user.

The data paths disclosed herein may include any device that communicatively couples devices to each other. For example, a data path may include one or more networks or one or more conductive wires (e.g., copper wires).

Figure 2:
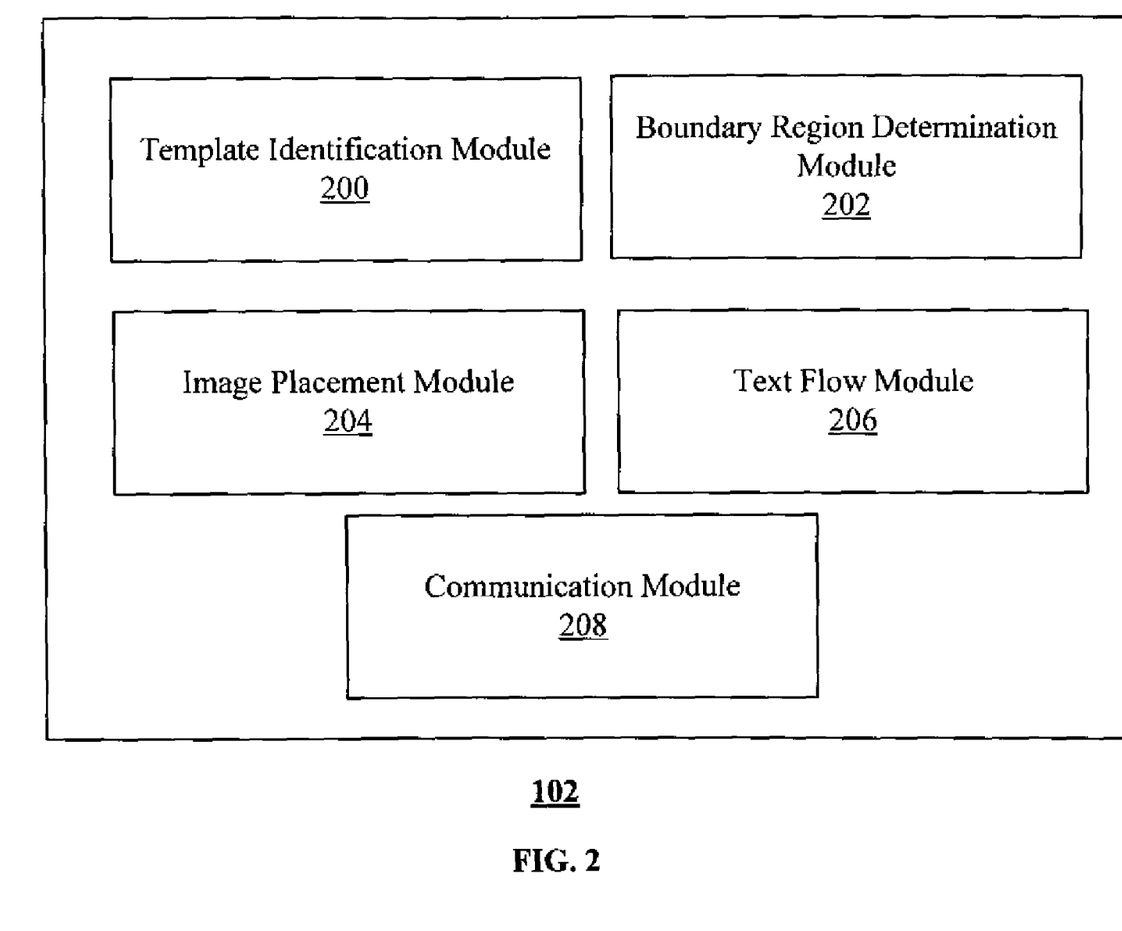
FIG. 2 illustrates exemplary modules of a content layout system according to an embodiment of the invention.

FIG. 2 illustrates exemplary modules of a content layout system according to an embodiment of the invention. In an exemplary embodiment, the content layout system 102 may include a template identification module 200, a boundary region determination module 202, an image placement module 204, a text flow module 206, and a communication module 208. It is noted that modules 200, 202, 204, 206, and 208 are exemplary. The functions of modules 200, 202, 204, 206, and 208 may be performed at other modules remote or local to the content layout system 102, and modules 200, 202, 204, 206, and 208 may be combined or separated. Other modules may be provided as necessary and/or desired.

The template identification module 200 may include any, or a combination, of software and hardware that may be configured to identify an image shape template. The template identification module 200 may identify an image shape template that is associated with a non-rectangular image to be embedded in electronic content. In one embodiment, the template identification module 200 may identify or select an image shape template based on the similarity of the shape of the image shape template to the shape of the non-rectangular image to be embedded in electronic content. For example, the template identification module 200 may identify or select an oval image shape template to embed a first non-rectangular image (e.g., an image of a giraffe) into electronic content. In another example, the template identification module 200 may identify or select a triangular image shape template to embed a second non-rectangular image (e.g., an image of a pyramid) into electronic content. In yet another example, the template identification module 200 may identify or select a circular image shape template to embed a third non-rectangular image (e.g., an image of a star) into electronic content. In yet another example, the template identification module 200 may identify or select a free-form image shape template (e.g., a shape of the image shape template that is created in free-form manner) to embed a fourth non-rectangular image (e.g., an image of a puddle of ink) into electronic content.

In another embodiment, the template identification module 200 may identify or select an image shape template based on the type of electronic content (e.g., a type associated with electronic magazines, a type associated with electronic newspapers, a type associated with web-based content) in which the non-rectangular image is to be embedded. In another embodiment, the template identification module 200 may identify or select an image shape template based on design preferences.

The boundary region determination module 202 may include any, or a combination, of software and hardware that may be configured to determine (e.g., calculate) a boundary region of the identified or selected image shape template. The boundary region determination module 202 may determine a boundary region that is defined by one or more sides (or circumference) of the identified or selected image shape template. For example, the boundary region determination module 202 may determine that a boundary region of a pentagonal image shape template includes an area that is defined by the five (5) sides of the pentagon. In another example, the boundary region determination module 202 may determine that a boundary region of a circular image shape template includes an area that is defined by the circumference of the circle. In yet another example, the boundary region determination module 202 may determine that a boundary region of a free-form image shape template includes an area that is defined by the contour of the free-form shape. In one embodiment, the boundary region determination module 202 may determine (e.g., calculate) the boundary region of an image shape template using one or more coordinates lying on the sides (or circumference) of the image shape template.

The image placement module 204 may include any, or a combination, of software and hardware that may be configured to place a non-rectangular image inside the boundary region of the image shape template and on the electronic content. In one embodiment, the image placement module 204 may determine a location based on the electronic content to place the non-rectangular image based on the size of the non-rectangular image. For example, the image placement module 204 may determine to place a large non-rectangular image on the top-half portion of the electronic content or bottom-half portion of the electronic content. In another example, the image placement module 204 may determine to place a small non-rectangular image on a portion of a column of the electronic content.

In another embodiment, the image placement module 204 may determine a location based on the electronic content to place the non-rectangular image based on the type of electronic content (e.g., a type associated with electronic magazines, a type associated with electronic newspapers, a type associated with web-based content). In another embodiment, the image placement module 204 may determine a location based on design preferences. The image placement module 204 may be configured to clip (e.g., trim, cut, crop) a non-rectangular image to ensure that the non-rectangular image fits inside the boundary region of the image shape template.

The text flow module 206 may include any, or a combination, of software and hardware that may be configured to flow text that is part of the electronic content outside and along the boundary region of the image shape template. In one embodiment, the text flow module 206 may flow text outside and along the boundary region at a particular distance from the boundary region. For example, the text flow module 206 may flow text along the boundary region at a distance of two (2) centimeters. In another example, the text flow module 206 may flow text along the boundary region at a distance of one (1) centimeter. The distance from the boundary region at which text is flowed may be determined based on any, or a combination, of the shape of the non-rectangular image, the size of the non-rectangular image, the type of the electronic content, the size of the display screen of a reader device, and design preferences.

The communication module 208 may include any, or a combination, of software and hardware that may be configured to transmit electronic content with one or more embedded non-rectangular images to one or more reader devices via data path 108 and data network 104. The communication module 208 may include any, or a combination, of software and hardware configured to communicate data received to one or more other modules of the content layout system 102, such as the template identification module 200, the boundary region determination module 202, the image placement module 204, and the text flow module 206. In one embodiment, the communication module 208 may be configured to communicate one or more messages received from one module to one or more other modules.

Figure 3A:
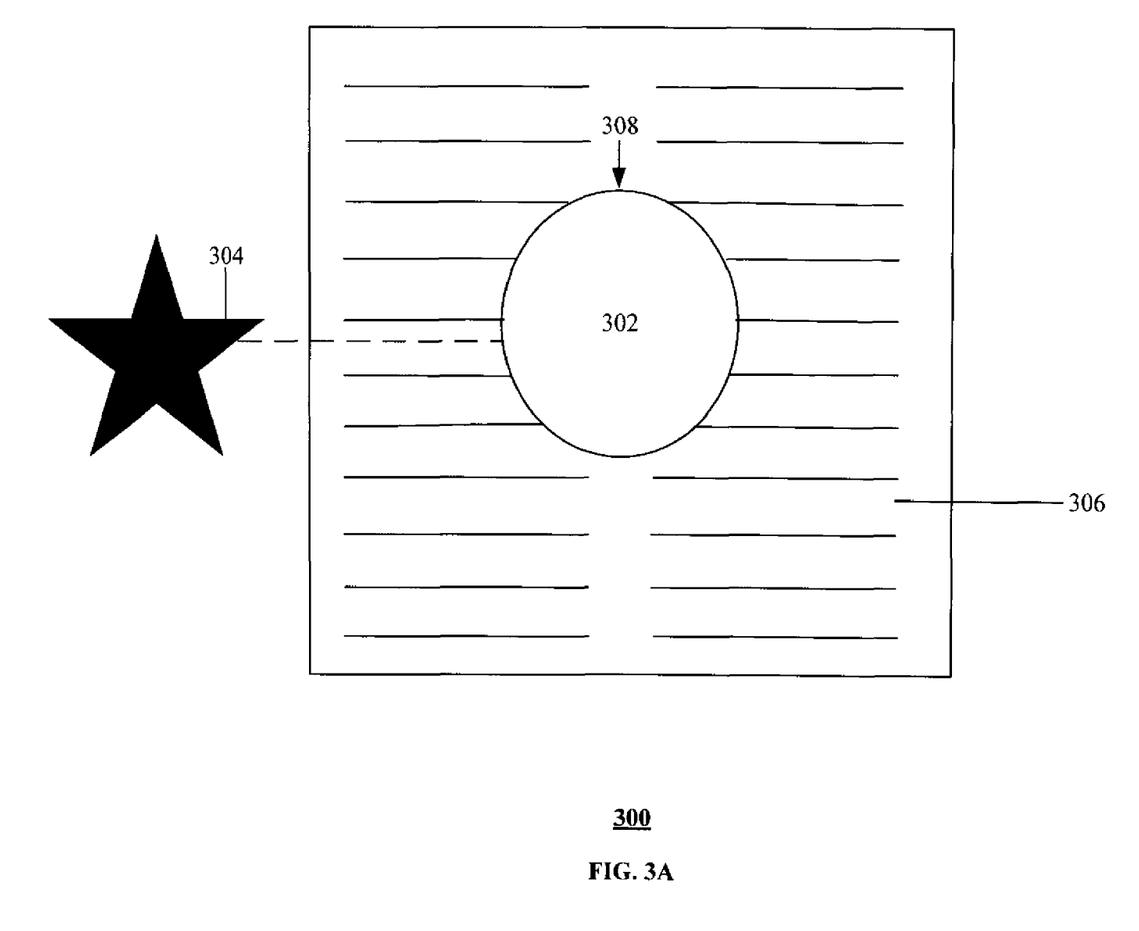
FIG. 3A illustrates an example diagram of an image shape template with electronic content according to an embodiment of the invention.

FIG. 3A illustrates an example diagram of an image shape template with electronic content according to an embodiment of the invention. As illustrated in FIG. 3A, the content layout system 102 may identify or select a circle image shape template 302 that has a shape that is similar to the shape of a non-rectangular image (e.g., a star image 304). The content layout system 102 may determine a boundary region 308 of the circle image shape template 302 on the electronic content 306. The boundary region 308 may include the circular area that is defined by the circumference of image shape template 302.

Figure 3B:
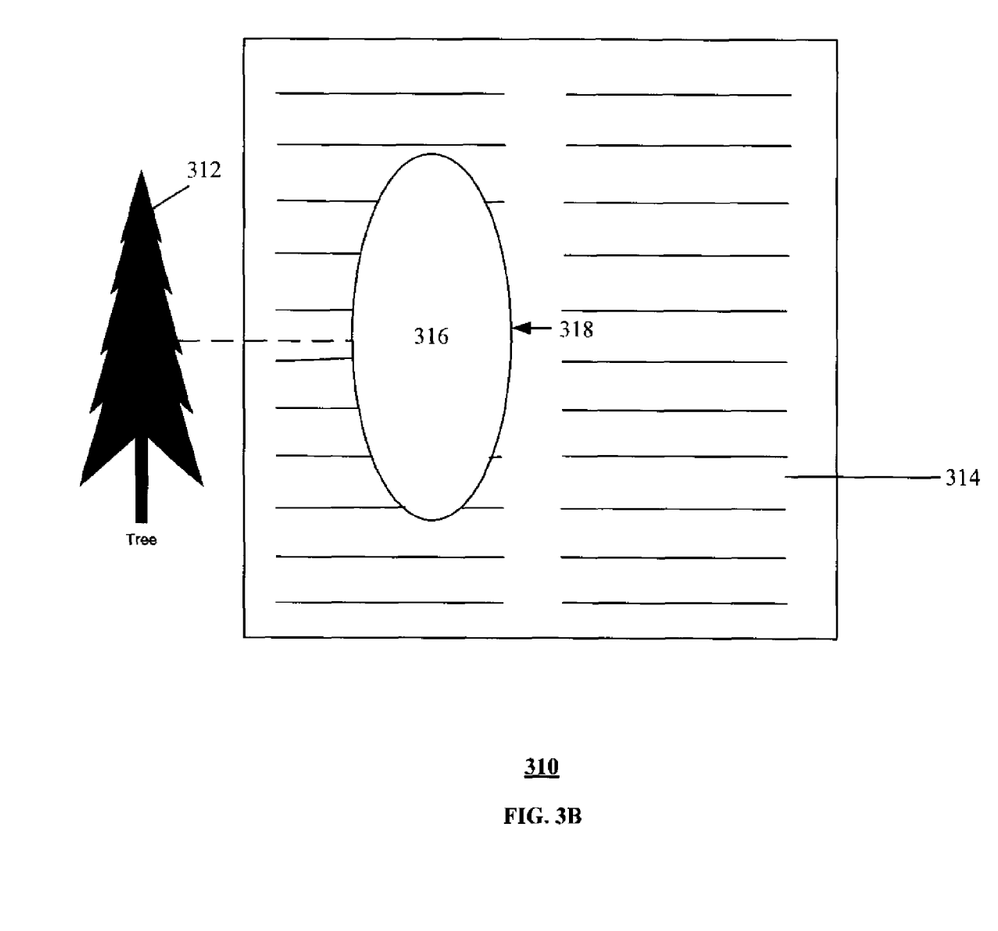
FIG. 3B illustrates an example diagram of another image shape template with electronic content according to an embodiment of the invention.

FIG. 3B illustrates an example diagram of another image shape template with electronic content according to an embodiment of the invention. As illustrated in FIG. 3B, the content layout system 102 may identify or select an oval image shape template 316 that has a shape that is similar to the shape of a non-rectangular image (e.g., a tree image 312). The content layout system 102 may determine a boundary region 318 of the oval image shape template 316 on the electronic content 314. The boundary region 318 may include the elliptical area that is defined by the circumference of oval image shape template 316.

Figure 3C:
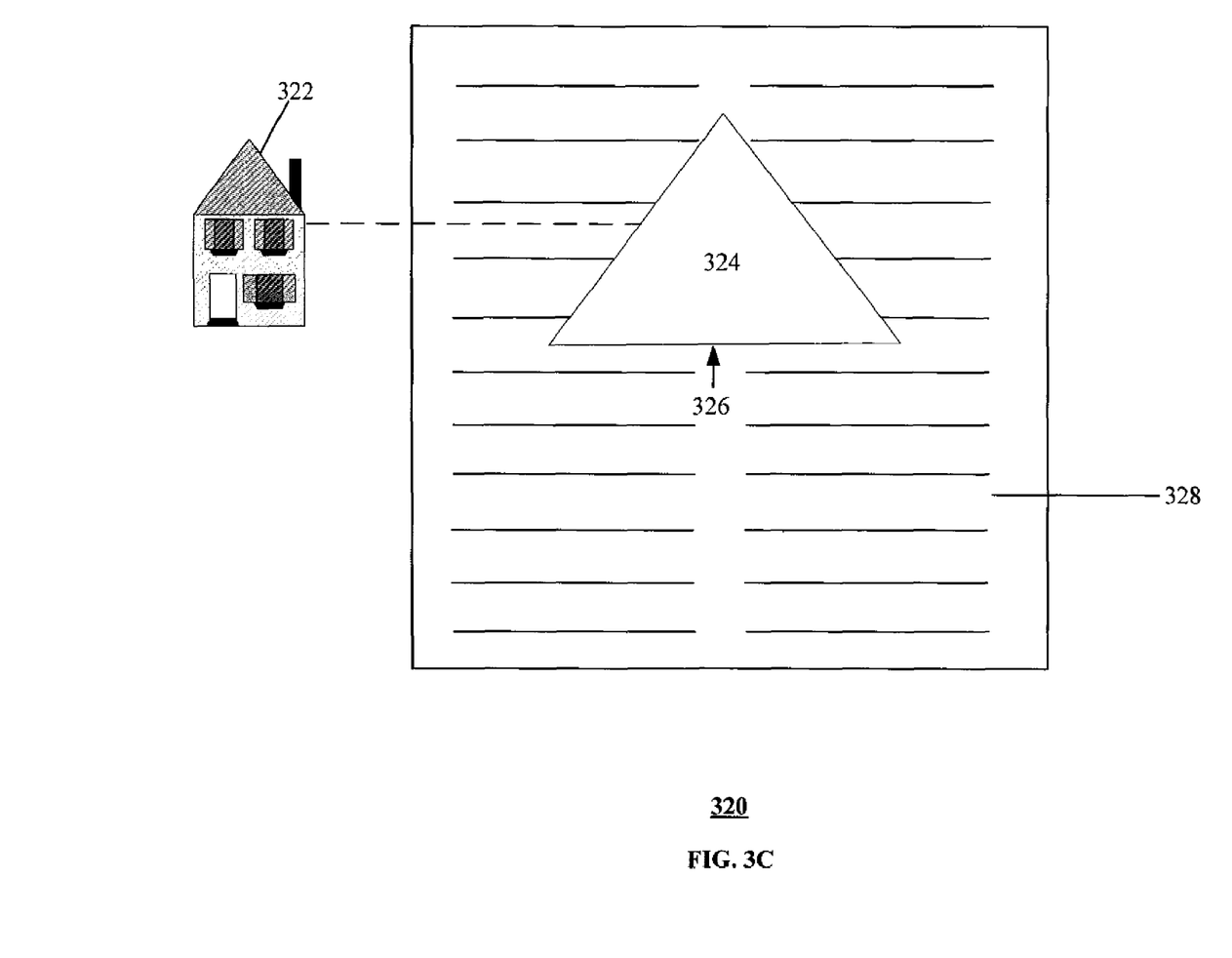
FIG. 3C illustrates an example diagram of another image shape template with electronic content according to an embodiment of the invention.

FIG. 3C illustrates an example diagram of another image shape template with electronic content according to an embodiment of the invention. As illustrated in FIG. 3C, the content layout system 102 may identify or select a triangle image shape template 324 that has a shape that is similar to the shape of a non-rectangular image (e.g., a house image 322). The content layout system 102 may determine a boundary region 326 of the triangle image shape template 324 on the electronic content 328. The boundary region 326 may include the triangular area that is defined by the sides of triangle image shape template 324.

Figure 4A:
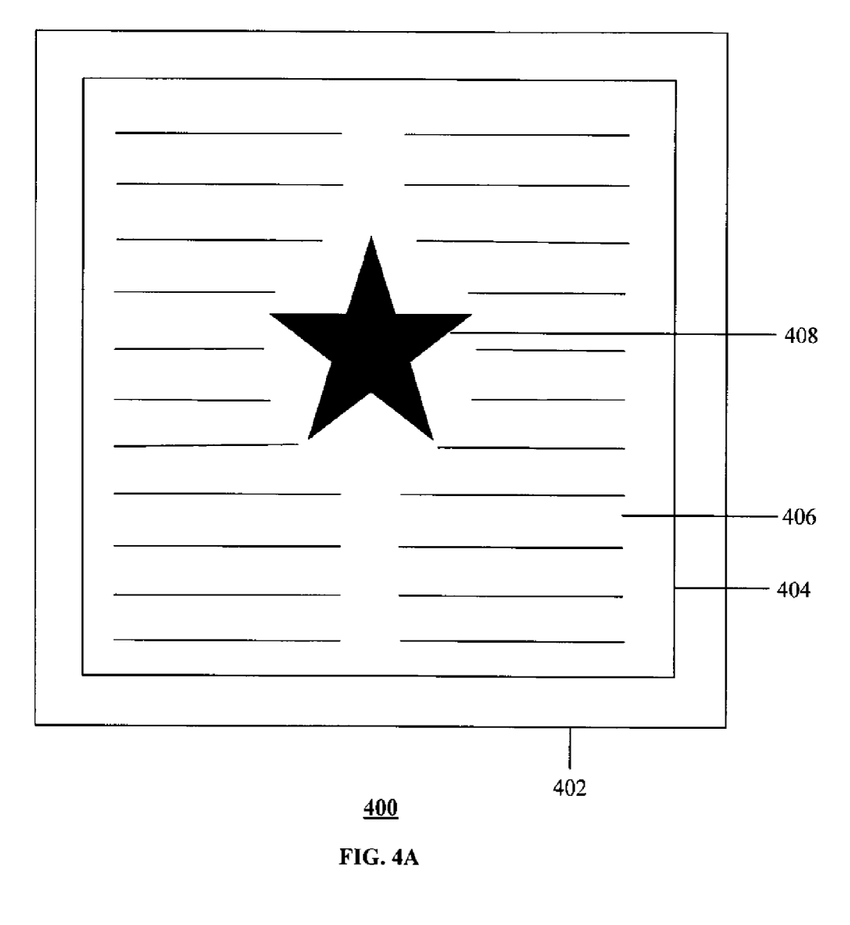
FIG. 4A illustrates an example diagram of a reader device displaying electronic content with a non-rectangular image according to an embodiment of the invention.

FIG. 4A illustrates an example diagram 400 of a reader device displaying electronic content with a non-rectangular image according to an embodiment of the invention. As illustrated in FIG. 4A, a reader device 402 may receive electronic content 406 that includes a non-rectangular image (e.g., a star image 408) from the content layout system 102 via a data network 104. After receiving the electronic content 406, the reader device 402 may display the electronic content 406 with the non-rectangular image (e.g., a star image 408) using a display device 404 (e.g., an EPD screen, a plasma display screen, an LCD screen). As shown, a non-rectangular image (e.g., a star image 408) may be embedded in the electronic content 406 within a boundary region as defined by an image shape template. The text of the electronic content 406 may be flowed outside of and along the boundary region that encloses the non-rectangular image (e.g., a star image 408). Accordingly, the star image 304 shown in FIG. 3A may be embedded in and displayed with electronic content 406 on a reader device 402.

Figure 4B:
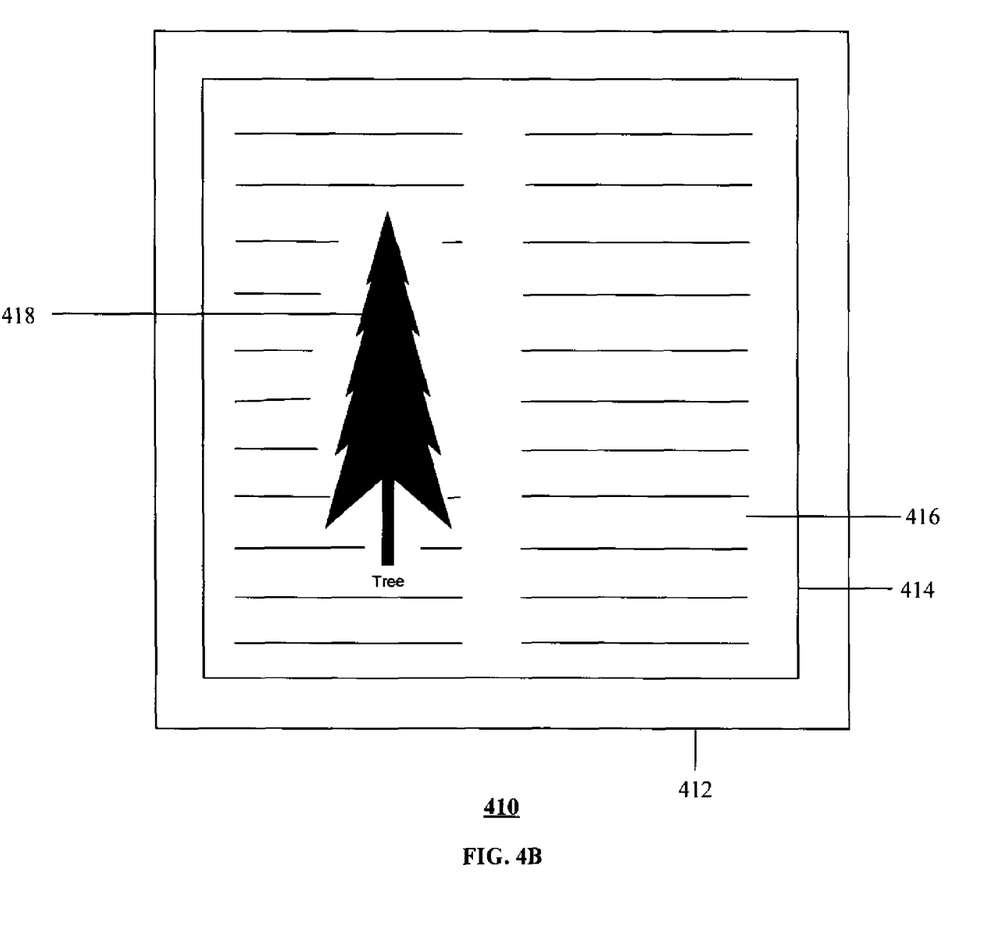
FIG. 4B illustrates an example diagram of a reader device displaying electronic content with another non-rectangular image according to an embodiment of the invention.

FIG. 4B illustrates an example diagram 410 of a reader device displaying electronic content with another non-rectangular image according to an embodiment of the invention. As illustrated in FIG. 4B, a reader device 412 may receive electronic content 416 that includes a non-rectangular image (e.g., a tree image 418) from the content layout system 102 via a data network 104. After receiving the electronic content 416, the reader device 412 may display the electronic content 416 with the non-rectangular image (e.g., a tree image 418) using a display device 414 (e.g., an EPD screen, a plasma display screen, an LCD screen). As shown, a non-rectangular image (e.g., a tree image 418) may be embedded in the electronic content 416 within a boundary region as defined by an image shape template. The text of the electronic content 416 may be flowed outside of and along the boundary region that encloses the non-rectangular image (e.g., a tree image 418). Accordingly, the tree image 312 shown in FIG. 3B may be embedded in and displayed with electronic content 416 on a reader device 412.

Figure 4C:
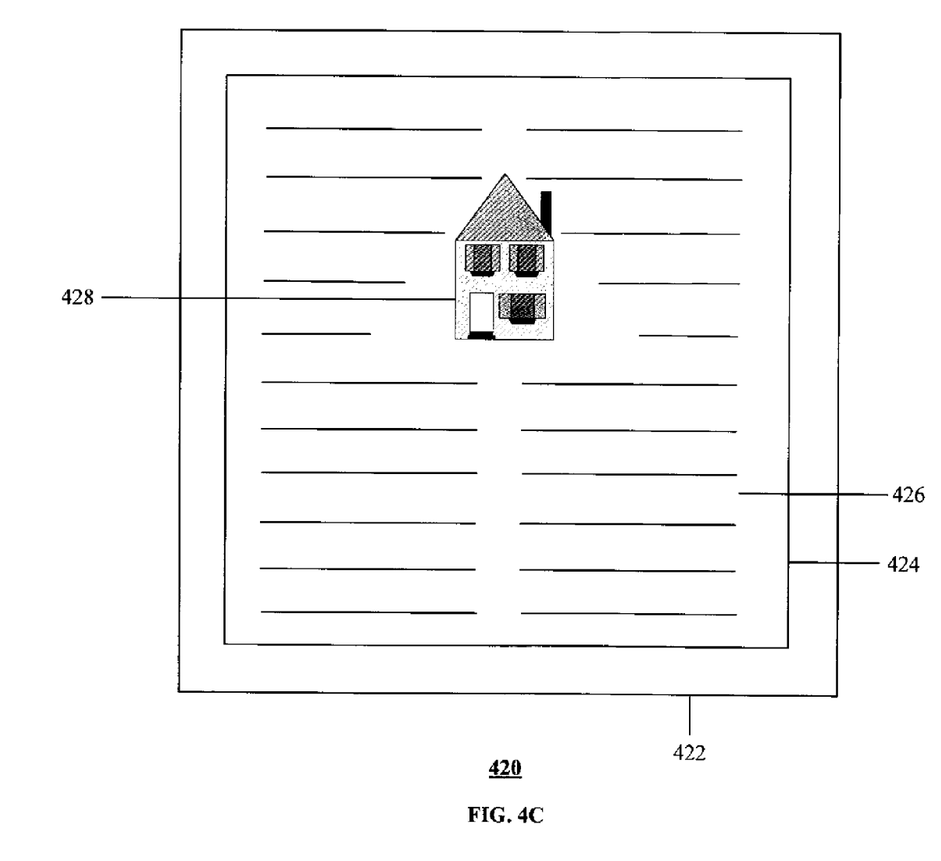
FIG. 4C illustrates an example diagram of a reader device displaying electronic content with another non-rectangular image according to an embodiment of the invention.

FIG. 4C illustrates an example diagram 420 of a reader device displaying electronic content with another non-rectangular image according to an embodiment of the invention. As illustrated in FIG. 4C, a reader device 422 may receive electronic content 426 that includes a non-rectangular image (e.g., a house image 428) from the content layout system 102 via a data network 104. After receiving the electronic content 426, the reader device 422 may display the electronic content 426 with the non-rectangular image (e.g., a house image 428) using a display device 424 (e.g., an EPD screen, a plasma display screen, an LCD screen). As shown, a non-rectangular image (e.g., a house image 428) may be embedded in the electronic content 426 within a boundary region as defined by an image shape template. The text of the electronic content 426 may be flowed outside of and along the boundary region that encloses the non-rectangular image (e.g., a house image 428). Accordingly, the house image 322 shown in FIG. 3C may be embedded in and displayed with electronic content 426 on a reader device 422.

Figure 5:
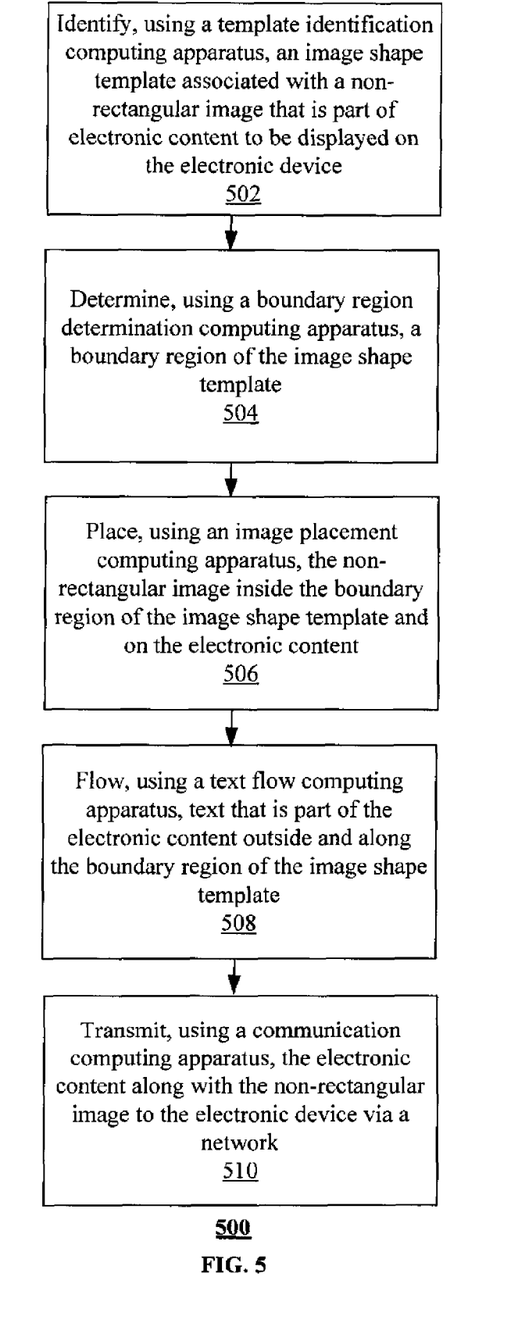
FIG. 5 is a flow chart illustrating a method of displaying non-rectangular images in electronic content on a reader device according to an embodiment of the invention.

FIG. 5 is a flow chart illustrating a method of displaying non-rectangular images in electronic content on a reader device according to an embodiment of the invention. This method is provided as an example; there are a variety of ways to carry out methods disclosed herein. The method 500 shown in FIG. 5 can be executed or otherwise performed by one or a combination of various systems. The method 500 is described below as carried out by the content layout system 102 shown in FIG. 1 by way of example, and various elements of the content layout system 102 are referenced in explaining the example method of FIG. 5. Each block shown in FIG. 5 represents one or more processes, methods, or subroutines carried in the method 500. Referring to FIG. 5, the method 500 may begin at block 502.

In block 502, the method 500 may include identifying an image shape template associated with a non-rectangular image that is part of electronic content to be displayed on one or more electronic devices. In one embodiment, the template identification module 200 of the content layout system 102 may identify an image shape template associated with a non-rectangular image that is part of electronic content to be displayed on one or more electronic devices. In one embodiment, the template identification module 200 may identify an image shape template that has a shape that is similar to the shape of the non-rectangular image. For example, the template identification module 200 may use an oval image shape template to embed an image of a giraffe into electronic content. In another example, the template identification module 200 may use a triangular image shape template to embed an image of a pyramid into electronic content. In yet another example, the template identification module 200 may use a circular image shape template to embed an image of a star into electronic content. The method 500 may continue to block 504.

In block 504, the method 500 may include determining a boundary region of the image shape template. In one embodiment, the boundary region determination module 202 of the content layout system 102 may determine a boundary region of the image shape template. For example, the boundary region determination module 202 may determine a boundary region that is defined by one or more sides (or circumference) of an identified or selected image shape template. The method 500 may continue to block 506.

In block 506, the method 500 may include placing the non-rectangular image inside the boundary region of the image shape template and on the electronic content. In one embodiment, the image placement module 204 of the content layout system 102 may place the non-rectangular image inside the boundary region of the image shape template and on the electronic content. The method 500 may continue to block 508.

In block 508, the method 500 may include flowing text that is part of the electronic content outside and along the boundary region of the image shape template. In one embodiment, the text flow module 206 of the content layout system 102 may flow text that is part of the electronic content outside and along the boundary region of the image shape template. In another embodiment, the text flow module 206 may flow text outside and along the boundary region at a particular distance from the boundary region. For example, the text flow module 206 may flow text along the boundary region at a distance of one (1) centimeter, two (2) centimeters, three (3) centimeters, etc. The distance from the boundary region at which text is flowed may be determined based on any, or a combination, of the shape of the non-rectangular image, the size of the non-rectangular image, the type of the electronic content, the size of the display screen of a reader device, and design preferences. The method 500 may continue to block 510.

In block 510, the method 500 may include transmitting the electronic content along with the non-rectangular image to the electronic device via a network. In one embodiment, the communication module 208 of the content layout system 102 may transmit the electronic content along with the non-rectangular image to the electronic device via a network. The method 500 may then end.

The description above describes systems, networks, and reader devices, that may include one or more modules, some of which are explicitly shown in the figures. As used herein, the term "module" may be understood to refer to any, or a combination, of computer executable software, firmware, and hardware. It is noted that the modules are exemplary. The modules may be combined, integrated, separated, or duplicated to support various applications. Also, a function described herein as being performed at a particular module may be performed at one or more other modules or by one or more other devices instead of or in addition to the function performed at the particular module. Further, the modules may be implemented across multiple devices or other components local or remote to one another. Additionally, the modules may be moved from one device and added to another device, or may be included in multiple devices.

It is further noted that the software described herein is tangibly embodied in one or more physical media, such as, but not limited to any, or a combination, of a compact disc (CD), a digital versatile disc (DVD), a floppy disk, a hard drive, read only memory (ROM), random access memory (RAM), and other physical media capable of storing software. Moreover, the figures illustrate various components (e.g., systems, networks, and reader devices) separately. The functions described as being performed at various components may be performed at other components, and the various components may be combined or separated. Other modifications also may be made.

In the instant specification, various exemplary embodiments have been described with reference to the accompanying drawings. It will, however, be evident that various modifications or changes may be made thereto, or additional embodiments may be implemented, without departing from the broader scope of the invention as set forth in the claims that follow. The specification and drawings are accordingly to be regarded in an illustrative rather than a restrictive sense.

The invention claimed is:

1. A computer-implemented method for displaying non-rectangular images in electronic content on an electronic device operating on a programmed computer, the computer-implemented method comprising:

identifying, using a template identification computing apparatus, a non-rectangular image to be embedded in an electronic content to be displayed on the electronic device;

selecting, using the template identification computing apparatus, an image shape template based on the similarity of the shape of the image shape template to the shape of the non-rectangular image;

determining, using a boundary region determination computing apparatus, a boundary region of the selected image shape template;

embedding, using an image placement computing apparatus, the non-rectangular image inside the boundary region of the selected image shape template and on the electronic content;

flowing, using a text flow computing apparatus, text that is part of the electronic content outside and along the boundary region of the selected image shape template; and transmitting, using a communication computing apparatus, the electronic content along with the non-rectangular image to the electronic device via a network.

2. The computer-implemented method of claim 1, wherein the image shape template comprises a polygonal shape.

3. The computer-implemented method of claim 1, wherein the image shape template comprises a ellipsoidal shape.

4. The computer-implemented method of claim 1, wherein the image shape template comprises a free-form shape.

5. The computer-implemented method of claim 1, further comprising clipping the non-rectangular image to fit inside the boundary region of the image shape template.

6. The computer-implemented method of claim 1, wherein determining the boundary region of the image shape template further comprises identifying one or more coordinates associated with one or more sides of the image shape template that define the boundary region of the image shape template.

7. The computer-implemented method of claim 1, wherein the electronic content comprises content that is digitally published.

8. The computer-implemented method of claim 1, wherein the electronic device comprises at least one of an electrophoretic display device, a plasma display device, a liquid crystal display device, and an organic light emitting diode display device.

9. The computer-implemented method of claim 1, wherein the non-rectangular image comprises a video clip.

10. A computer-implemented system for displaying non-rectangular images in electronic content on an electronic device, the computer-implemented system comprising:

a template identification computing apparatus configured to identify a non-rectangular image to be embedded in an electronic content to be displayed on the electronic device, and select an image shape template based on the similarity of the shape of the image shape template to the shape of the non-rectangular image;

a boundary region determination computing apparatus configured to determine a boundary region of the selected image shape template;

an image placement computing apparatus configured to embed the non-rectangular image inside the boundary region of the selected image shape template and on the electronic content;

a text flow computing apparatus configured to flow text that is part of the electronic content outside and along the boundary region of the selected image shape template; and a communication computing apparatus configured to transmit the electronic content along with the non-rectangular image to the electronic device via a network.

11. The computer-implemented system of claim 10, wherein the image shape template comprises a polygonal shape.

12. The computer-implemented system of claim 10, wherein the image shape template comprises a ellipsoidal shape.

13. The computer-implemented system of claim 10, wherein the image shape template comprises a free-form shape.

14. The computer-implemented system of claim 10, wherein the image placement computing apparatus is further configured to clip the non-rectangular image to fit inside the boundary region of the image shape template.

15. The computer-implemented system of claim 10, wherein the boundary region determination computing apparatus is configured to determine the boundary region of the non-rectangular image shape template by identifying one or more coordinates associated with one or more sides of the image shape template that define the boundary region of the image shape template.

16. The computer-implemented system of claim 10, wherein the electronic content comprises content that is digitally published.

17. The computer-implemented system of claim 10, wherein the electronic device comprises at least one of an electrophoretic display device, a plasma display device, a liquid crystal display device, and an organic light emitting diode display device.

18. The computer-implemented system of claim 10, wherein the non-rectangular image comprises a video clip.

* * * * *